Jan. 1, 1935. M. J. GEARING ET AL 1,986,334
APPARATUS FOR THE MANUFACTURE OF SALT
Filed Aug. 22, 1930 2 Sheets-Sheet 2
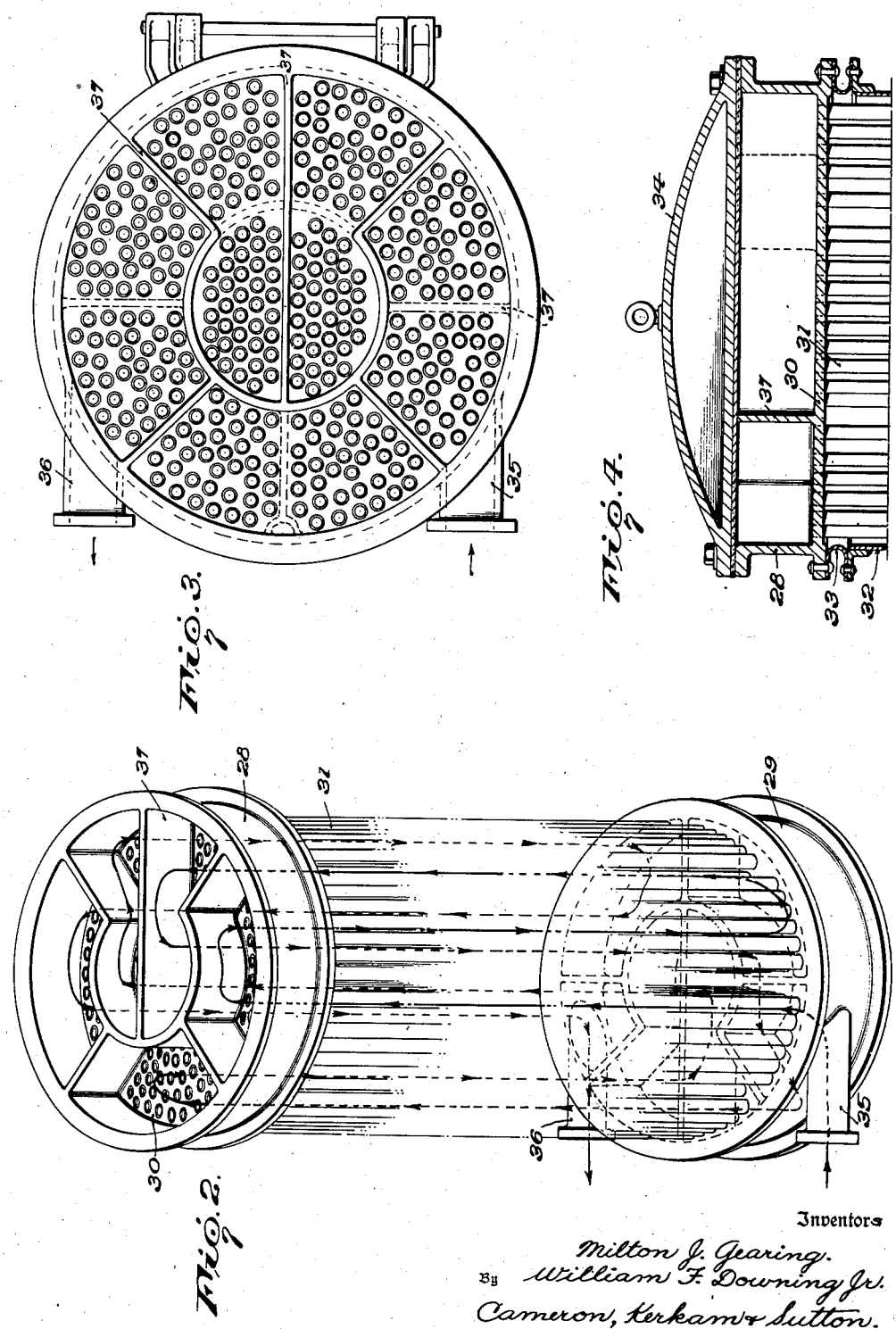
Inventors
Milton J. Gearing.
William F. Downing Jr.
By Cameron, Kerkam & Sutton.
Attorneys Patented Jan. 1, 1935

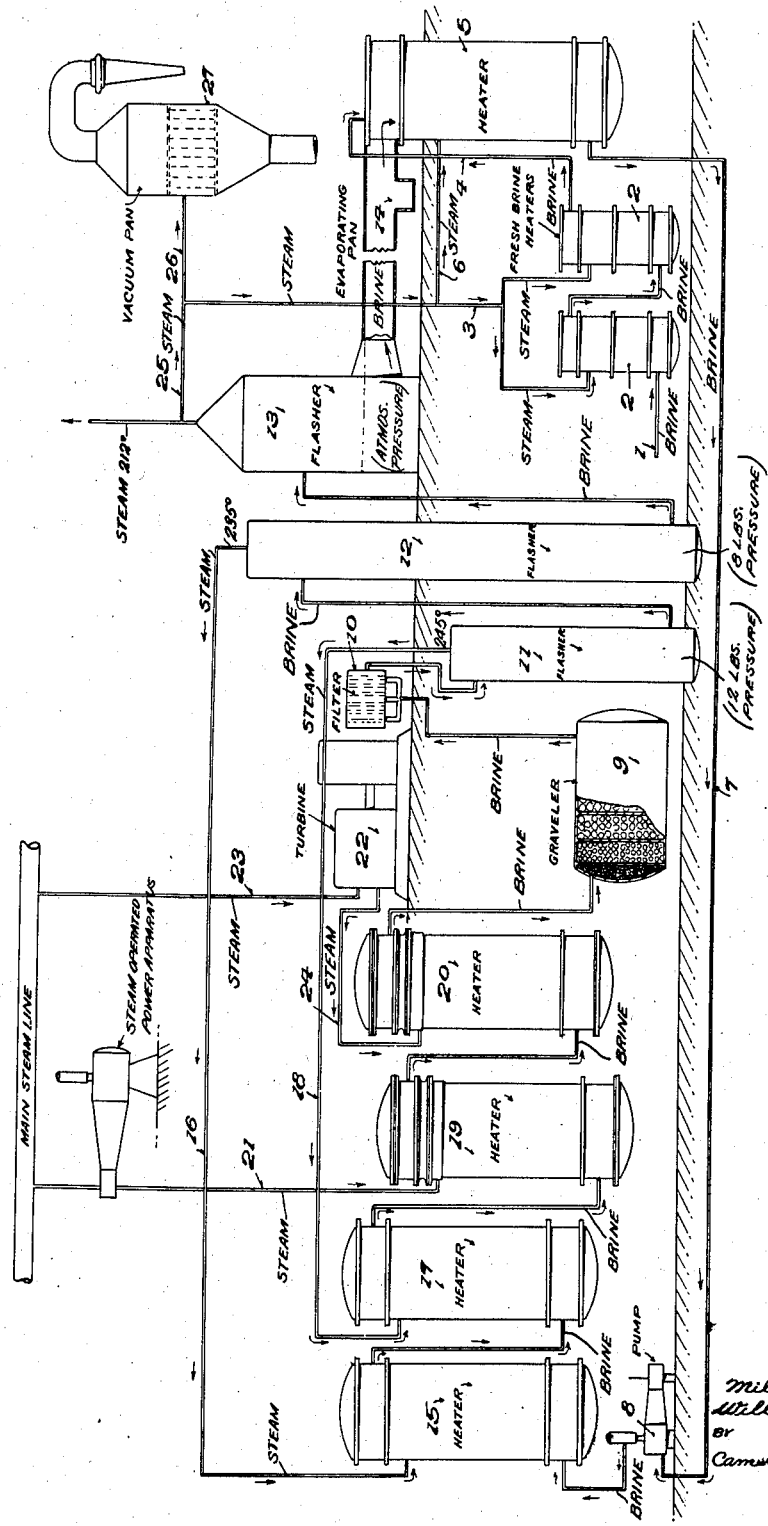

1,986,334

UNITED STATES PATENT OFFICE 1,986,334

APPARATUS FOR THE MANUFACTURE OF SALT

Milton J. Gearing and William F. Downing, Jr., St. Clair, Mich., assignors to General Foods Corporation, New York, N. Y., a corporation of Delaware Application August 22, 1930, Serial No. 477,046

7 Claims. (Cl. 23—260)

This invention relates to improvements in systems and apparatus for making salt.

This invention is particularly applicable to the known Alberger system of manufacturing salt, which system in simple form is illustrated and described in United States Patent No. 1,141,999 to Charles L. Weil, although not necessarily restricted to this use. According to the Alberger process as usually practiced, brine is first preheated to a temperature somewhat below its normal boiling point, which for saturated brine is about 226° F. This heated brine is then forced under sufficient pressure to prevent boiling through suitable heaters wherein the brine attains a temperature of about 275° F. At this temperature impurities such as calcium sulphate are precipitated and removed from the brine, usually by passing the brine through "gravelers" wherein the impurities deposit. The superheated brine is then conducted to one or more flashers in which the pressure is released, causing the brine to boil violently, and then to an open evaporating pan. In the evaporating pan crystallization of the salt takes place, the crystals being recovered in any suitable manner, and the remaining brine is again conducted through the heaters and flashers as above described, fresh brine being added to the system to compensate for evaporation losses. It will be understood that the heaters, gravelers, etc. may be arranged in parallel series to permit continuous operation of the system and simultaneous cleaning of the various elements.

It is an object of the present invention to provide an improved system of the Alberger type that is designed to provide maximum efficiency in operation, and to effect substantial economies without detriment to the operation of the system, whereby operating costs are reduced without affecting production. Other objects include the provision of novel brine heating means in a system of this character, novel means for utilizing waste exhaust vapors from the operation of the plant to advantage in the salt making system, and novel means for utilizing heretofore waste vapors from the system itself. Other objects will appear more fully hereinafter.

One embodiment of the invention has been illustrated in the accompanying drawings, but it is to be expressly understood that said drawings are for purposes of illustration only and are not to be construed as a definition of the limits of the invention, reference being had to the appended claims for this purpose.

In said drawings—

Fig. 1 is a diagrammatic representation of a system for making salt according to the Alberger process, wherein the invention is embodied;

Fig. 2 is a diagrammatic illustration in perspective of a heater which may be employed in the system shown in Fig. 1;

Fig. 3 is a horizontal section through the heater shown in Fig. 2; and

Fig. 4 is a detail view of a part of said heater.

It will be understood that the various elements of the system to be described hereinafter may be of any suitable form and construction, said elements being shown diagrammatically in the drawings. Referring now to Fig. 1, brine from any suitable source is fed to the system in any suitable manner through a supply pipe 1 and passes through one or more preliminary fresh brine heaters 2, heated by steam or the like conducted thereto by means of pipe 3. In the embodiment shown, pipe 3 conducts steam or vapor at atmospheric pressure to the heaters, which steam may be exhausted from another part of the system as described hereinafter. From the heater 2 the brine is conducted through a pipe 4 to a heater 5 which likewise receives the tail brine from the system as hereinafter described, said heater 5 being supplied with steam or the like through pipe 6 branching from pipe 3.

The mixture of fresh and tail brine from heater 5, which may be at a temperature of approximately 200° F., is fed to a system of the type described above wherein its temperature is increased under pressure to approximately 275° F. and the pressure thereafter released to cause the brine to boil violently. Accordingly the brine is taken from the bottom of heater 5 by means of a pipe 7 and pump 8 of any suitable type and is fed to a heating system comprising a plurality of serially arranged heaters which as shown are four in number. From the last heater the brine at a temperature of approximately 275° F. is conducted through a graveler 9 and preferably through a filter 10, both of any suitable type, into a first flasher 11 wherein the pressure is reduced, for example, to approximately 12 pounds. The hot brine boils violently under this reduced pressure, giving off steam which leaves the flasher at a temperature of 245° F. corresponding to a gauge pressure of 12 pounds, the brine then passing to a second flasher 12 wherein the pressure is again reduced, for example, to about 8 pounds and steam is given off at the corresponding temperature of 235° F. The brine may then be conducted to a third flasher 13 wherein the pressure is reduced to atmospheric pressure and steam is given off at a temperature of 212° F., the brine being then discharged into an open evaporating pan 14 wherein the salt crystals are recovered in any suitable manner and the tail brine being discharged into heater 5. It is to be expressly understood, however, that the number and arrangement of elements such as flashers and heaters and the temperatures and pressures specified above are mentioned only as an illustration of practical operating conditions and may vary widely.

It will be observed that a considerable expenditure of heat is required to raise the temperature of the circulating brine from approximately 200° F. at the pump 8 to 275° F. at the discharge from the final heater, and the present invention provides novel means for obtaining the desired final temperature. Referring again to the embodiment of the invention shown in Fig. 1, the first heater 15 of the series is supplied by pipe 16 with steam discharged from flasher 12 which as above stated may be at a temperature of about 235° F. and may suffice to raise the temperature of the brine to about 215° F. The second heater 17 of the series may be similarly supplied by pipe 18 with steam discharged from the flasher 11 at a temperature of about 245°, whereby the temperature of the brine may be raised to about 230° F.

The final elevation of temperature to about 275° F. is obtained by the use of heaters 19 and 20 supplied with exhaust steam from other apparatus in the plant external to the system. Heaters 19 and 20 are preferably of the multipass type described in detail below. Heater 19 is supplied through a pipe 21 with exhaust steam, which may for example be derived from the operation of machinery such as pumps and the like, at about 15 pounds pressure and at a corresponding temperature of about 250° F. A steam turbine 22 is provided for any suitable purpose, said turbine for example forming part of a turbo generator providing electrical power for the plant and preferably being of a type adapted to operate at high pressure and with high back pressure. Steam is supplied to turbine 22 through pipe 23 and the exhaust steam of this turbine, which in the embodiment described is at a pressure of about 80 pounds and a corresponding temperature of about 324° F., is conducted through pipe 24 to heater 20. Owing to the increased efficiency of the heater and the high temperature of the exhaust steam supplied thereto, sufficient heat is supplied to the brine to raise the temperature to the desired final temperature set forth above.

In order to utilize as completely as possible all of the available heat in the system, the steam at atmospheric pressure escaping from flasher 13 through pipe 25 is conducted partly through the pipe 3 to the preliminary fresh brine heaters 2 and partly through a pipe 26 to a vacuum pan 27 of any suitable type whereby additional salt may be manufactured.

Figs. 2, 3, and 4 illustrate one form of multipass heater which may be employed in the system illustrated in Fig. 1. Said heater is provided with upper and lower headers 28 and 29 respectively, the bottoms 30 of which constitute tube sheets between which extend a plurality of tubes 31. Tubes 31 between the headers 28 and 29 are surrounded by a suitable casing 32 and preferably an expansion joint 33 connects the top of casing 32 with the top header 28. Each of the headers 28 and 29 is closed by a suitable cap 34. Casing 32 is filled with steam supplied by pipe 24 and brine is circulated through the tubes, entering the bottom header 29 through inlet 35 and leaving by outlet 36, suitable partitions 37 being provided in the top and bottom headers to cause the brine to pass through the heater a plurality of times. In the form shown, the nest of tubes 31 is divided into ten sections by the partitions 37 which are suitably arranged to cause the brine to circulate through these sections in series, as indicated diagrammatically by the flow line in Fig. 2.

The apparatus described above provides for efficient utilization of the available heat and results in economy of operation without affecting the production of the system. The use of a high back pressure turbine makes available a quantity of exhaust steam of relatively high temperature which, together with the use of properly designed heaters, makes it possible to obtain the relatively high brine temperatures desired without the expenditure of the considerable quantities of live steam heretofore required. Moreover, the use of the steam generated in the last flasher to operate the vacuum pan eliminates a further source of waste in the system as heretofore operated and effects further economies. It will be understood that the invention is not limited to the embodiments described and shown in the drawings, since other forms of heaters could be employed, while the number and arrangement of the elements and the operating conditions such as temperature, pressure, etc., could be varied within considerable limits without departing from the spirit of the invention. Reference is therefore to be had to the appended claims for a definition of the limits of the invention.

What is claimed is:

1. In a system for making salt of the type wherein brine is heated under pressure to a temperature above its normal boiling point and is caused to boil by releasing the pressure in a flasher, means for heating said brine comprising a heater, means for conducting steam from said flasher to said heater, a second heater, steam-operated power apparatus, means for conducting exhaust steam from said apparatus to said second heater, a third heater, a steam turbine adapted to operate with high back pressure, means for conducting exhaust steam from said turbine to said third heater, and means for circulating brine to be heated through said heaters in series.

2. In a system for making salt of the type wherein brine is heated under pressure to a temperature above its normal boiling point, the combination of a pair of heaters in series, said heaters being of the multipass type, steam-operated power apparatus, means for conducting exhaust steam from said apparatus to the first of said heaters, a high pressure steam turbine, means for conducting exhaust steam from said turbine to the second of said heaters, and means for circulating brine through said heaters.

3. In a system for making salt of the type wherein brine is heated under pressure to a temperature above its normal boiling point and is caused to boil by releasing the pressure in a flasher, means for heating said brine comprising a heater, means for conducting steam from said flasher to said heater, a second heater of the multipass type, steam-operated apparatus, means for conducting exhaust steam from said apparatus to said second heater, a third heater of the multipass type, a high pressure steam turbine, means for conducting exhaust steam from said turbine to said third heater, and means for circulating brine through said heaters in series.

4. In a system for making salt, the combination of a plurality of heaters in series whereby brine is heated under pressure to a temperature above its normal boiling point, a plurality of flashers in series whereby the pressure is successively reduced to atmospheric pressure, means for circulating brine through said flashers and heaters, means for conducting steam from said flashers to said heaters, a high back pressure turbine, means for conducting exhaust steam from said turbine to the last heater in the series, a vacuum pan, and means for conducting steam from the last flasher in the series to said vacuum pan.

5. A salt making plant comprising in combination a steam turbine operating with high back pressure, steam-operated power apparatus, a plurality of brine heaters and a plurality of flashers in series, means for conducting the exhaust steam from said flashers to certain of said heaters, means for conducting the exhaust steam from said apparatus to another heater, and means for conducting the high pressure exhaust steam from said turbine to another heater.

6. A salt making plant comprising in combination a steam turbine operating with high back pressure, steam-operated power apparatus, four brine heaters and at least two flashers all serially connected, means for conducting exhaust steam from the second flasher to the first heater, means for conducting exhaust steam from the first flasher to the second heater, means for conducting the exhaust steam from said apparatus to the third heater, and means for conducting the high pressure exhaust steam from said turbine to the fourth heater.

7. A salt making plant comprising in combination a steam turbine operating with high back pressure, steam-operated power apparatus, a heating system including a preliminary brine heater, four main brine heaters, and three flashers all serially connected, a vacuum pan, an exhaust conduit for the last flasher connected with said preliminary heater and said vacuum pan, an exhaust conduit for the second flasher connected with the first main heater, an exhaust conduit for the first flasher connected with the second main heater, the third and fourth main heaters being of the multipass type, means for conducting exhaust steam from said apparatus to said third heater, and means for conducting high pressure exhaust steam from said turbine to said fourth heater.

MILTON J. GEARING.
WILLIAM F. DOWNING, Jr.